June 8, 1926.
B. M. W. HANSON
1,587,518
TESTING OR MEASURING APPARATUS
Filed May 21, 1923
3 Sheets-Sheet 1
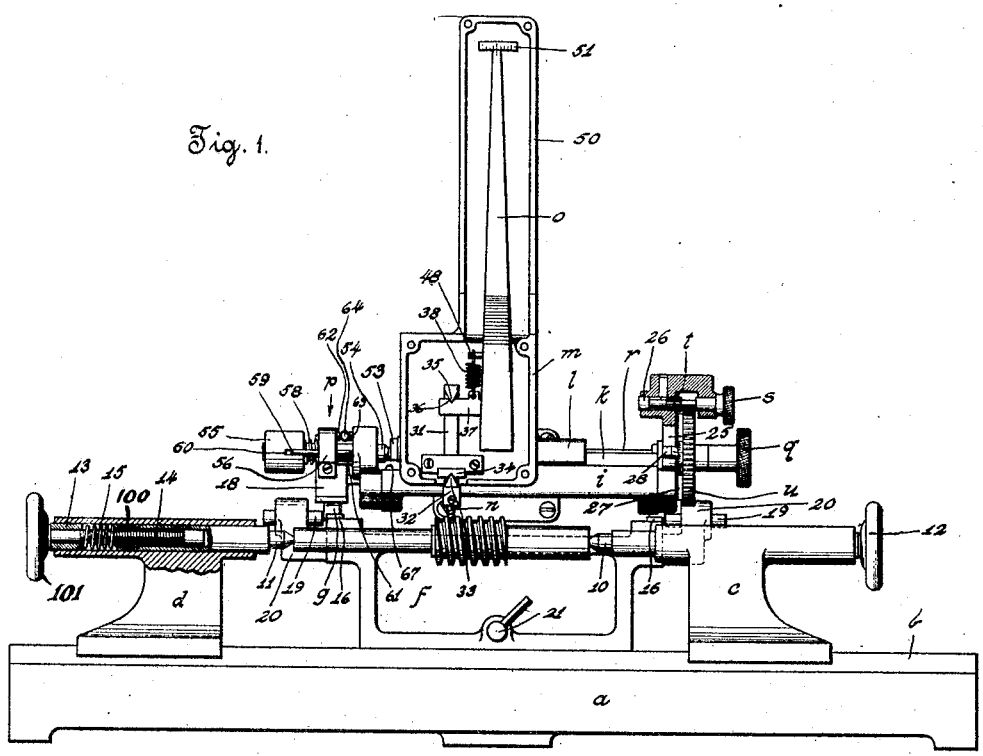
Fig. 1.
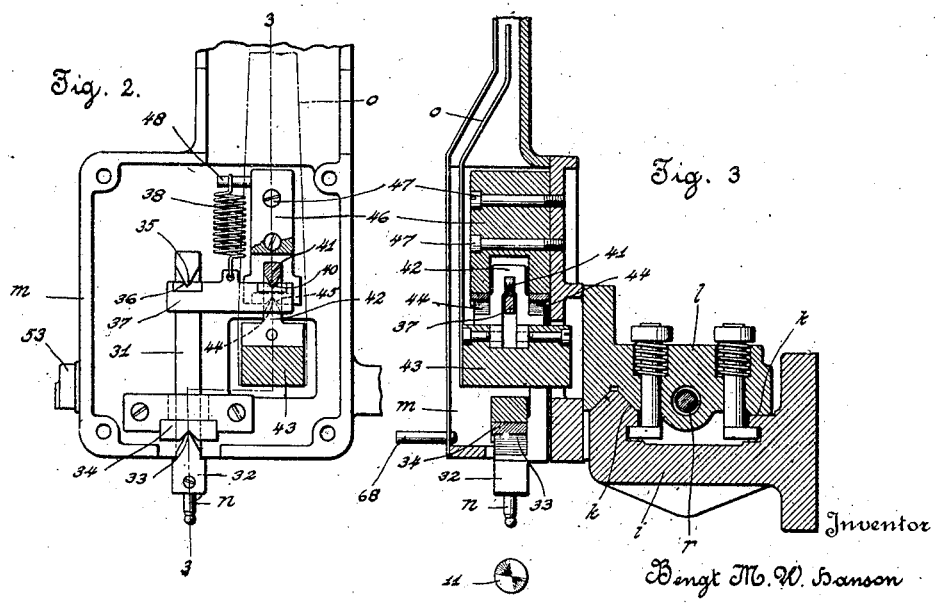
Fig. 2.
Fig. 3.
Inventor
Bengt M. W. Hanson
By T. Clay Lindsey
His Attorney.

June 8, 1926.
B. M. W. HANSON
TESTING OR MEASURING APPARATUS
Filed May 21, 1923
1,587,518
3 Sheets-Sheet 2
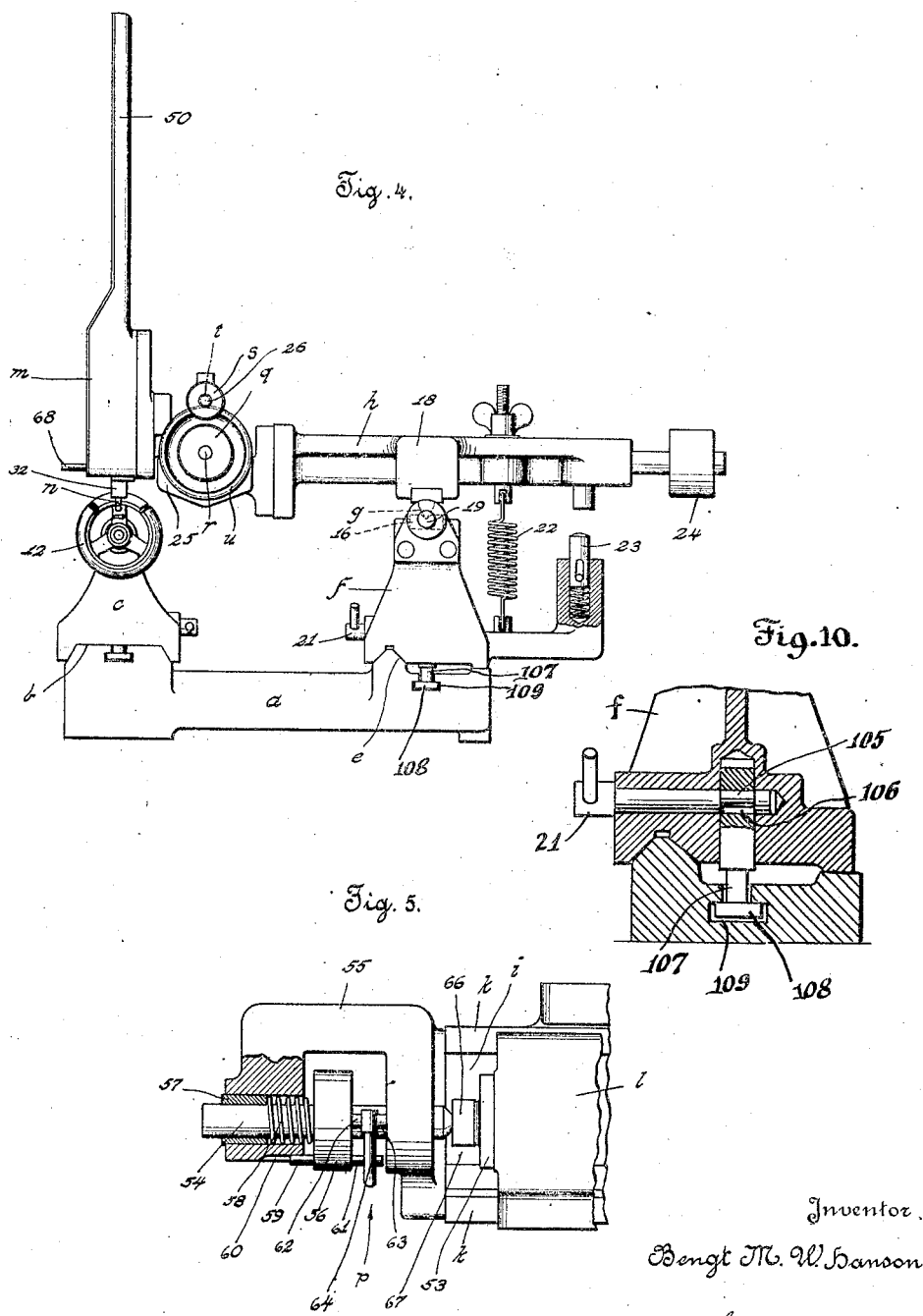

Inventor
Bengt M. W. Hanson.
by T. Clay Lindsey
His Attorney

Patented June 8, 1926.

1,587,518

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

TESTING OR MEASURING APPARATUS.

Application filed May 21, 1923. Serial No. 640,348.

This invention relates to devices for testing or measuring the dimensions, spacing or trueness, etc., of various kinds of members or parts. As instances of uses to which my apparatus may be applied, reference may be had to the measurement of the distance between, or indicating the inaccuracies in the spacing of, certain elements, for instance, spaced apart grooves or ribs; or to the measurement of various dimensions of pieces of work. My improved apparatus is particularly applicable for use in testing, for instance, the lead of a screw thread by determining the distance to which the successive convolutions of the thread are spaced apart. It is, of course, evident that I herein disclose for illustrative purposes only several of the embodiments which the present invention may take, it being evident that the device is susceptible of various uses and of various modifications and changes which may come within the purview of the annexed claims.

The aim of the invention is to provide an apparatus of this sort by means of which measurements may be very quickly and readily determined with great accuracy.

Another object of the invention is to provide an apparatus of a relatively simple nature which may be readily adjusted and quickly manipulated to determine with extreme precision the extent of inaccuracies in pieces of work, as, for instance, in the relation of spaced apart serrations or the successive convolutions of a threaded member.

Other objects will be in part obvious and in part pointed out hereinafter.

The invention accordingly consists in the features of construction, combination of elements and arrangement of parts which will be exemplified in the construction illustrated in the accompanying drawings, wherein is disclosed one embodiment which the present invention may take.

In these drawings:

Figure 1 is a view in front elevation of my improved apparatus, the cover plate for the indicating device being removed;

Fig. 2 is a partial view in front elevation and on an enlarged scale of the mechanism embodied in the indicating device;

Fig. 3 is a sectional view in side elevation of the indicating device, this view being taken substantially on line 3—3 of Fig. 2;

Fig. 4 is a side elevational view looking towards the right end of Fig. 1;

Fig. 5 is a plan view, partly in section, of the hereinafter described drop pin arrangement;

Fig. 10 is a sectional view and shows the means for clamping the fulcrum member $f$ in adjusted position on the base $a$.

Figure 6:
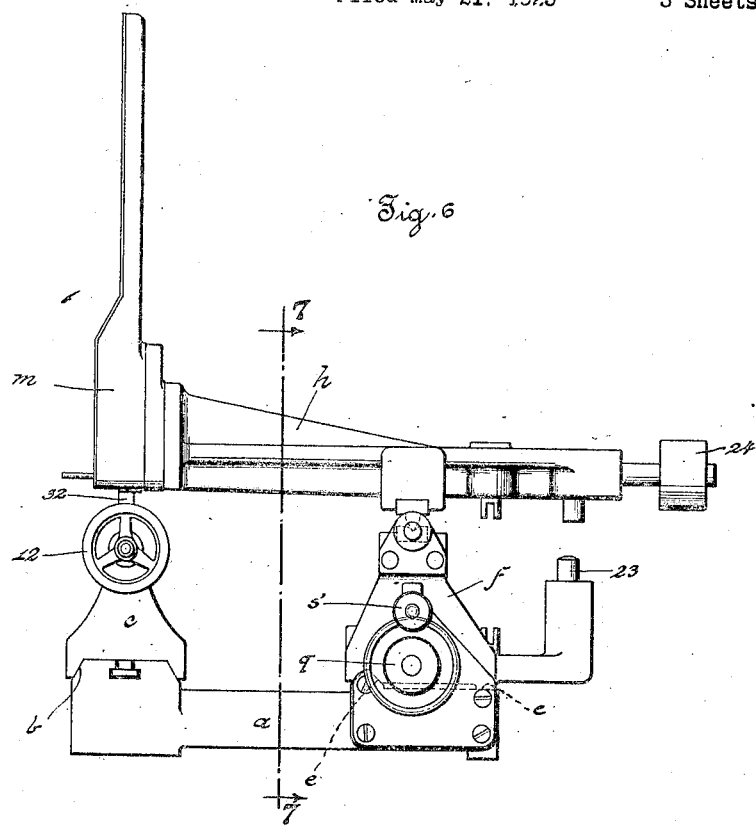
Fig. 6 is a view similar to Fig. 4, but showing a slightly different embodiment of my invention.

Referring to the drawings in detail, and particularly to Figs. 1 to 5 inclusive, $a$ indicates a base of any suitable construction provided with longitudinal ways $b$ on which are mounted for sliding or adjustable movement means for supporting the piece to be tested as, for instance, the head and tail stocks $c$ and $d$, respectively. Also, provided on the base in parallelism with the longitudinal ways $b$ are the ways $e$ slidably supporting a rest of fulcrum member $f$ on the top of which is fulcrumed, as by means of knife edges $g$, a swinging support or arm $h$ carrying on its forward end a longitudinally extending head or bracket $i$ provided with longitudinally extending ways $k$. Mounted for adjustment on these ways is an indicator slide $l$ on the front face of which is secured a casing $m$ which supports and houses the indicator mechanism. This indicator mechanism includes a point $n$ adapted for engagement with the piece to be tested, an indicating finger $o$, and a connection between the point and finger through which a slight movement of the point causes a relatively large movement of the finger, as hereinafter described more in detail. The letter $p$ indicates generally a drop pin arrangement by means of which, in combination with suitable gauge blocks adapted to be selectively interposed between this arrangement $p$ and the indicator, the latter may be very accurately adjusted to operating position. Rough adjustment of the indicating device may be effected by turning the knob $q$ directly mounted on the screw $r$ associated with the indicator slide $l$, and fine adjustment is effected by turning the knob $s$, which is connected up with the screw $r$, through the intermeshing pinion $t$ and gear $u$.

When the piece to be tested is in the form of a gauge plug or screw, this piece is mounted between the centers 10 and 11 of the head and tail stocks, the center 10 being longitudinally adjusted upon turning the hand wheel 12. The center 11 is slidably mounted in the tail stock $d$, being normally urged to engage the work by a spring 15 interposed between the rear end of the center and a bushing 13 fixed in the outer end of the tail stock $d$. 14 designates a screw having a bearing in the bushing 13 and adapted to move axially in the bushing. In the rear end of the center 11 is fixed a nut 100 which has threaded engagement with the screw. The spring 15 surrounds that portion of the screw between the bushing and the rear end of the center. To adjust the center, it is merely necessary to rotate the screw 14 which has a handle 101 on its outer end. The spring 15 normally urges the center 11 towards the opposed center 10. The supporting means for the work will, of course, vary, depending on characteristics of the work. For example, the block $c'$, of Figs. 8 and 9, may be used where it is desired to measure the dimensions of a cylinder.

The rest or fulcrum member $f$ has, at its opposite ends, suitable blocks or rests 16 provided with V's in which the knife edges $g$ engage, these knife edges being carried by the lateral extensions 18 of the swinging support $h$. For the purpose of preventing lateral movement of the swinging arm, the knives $g$ are positioned between suitable thrust pins 19 mounted in brackets 20 arising from the opposite ends of the member $f$. Preferably, the knife edges $g$ are pointed at the corners at which they engage the pins 19, so as to reduce friction to a minimum. The pointed corners of the knife edges are designated by the numeral 115. The rest or fulcrum member $f$ may be clamped in any position of adjustment by means of a binding bolt 21. The means for clamping the rest $f$ in any position of adjustment may be of any suitable sort. For illustrative purposes, only, I have shown, in Fig. 4, the clamping bolt 21 as having an eccentric stud 105 on its inner end engaging in an opening 106 in a pin 107 having a head 108 located in a T-slot 109 in the base. When the clamp is turned in the proper direction, the stud 105 thereof lifts on the pin 107 so as to bind the head 108 against the upper wall of the slot 109. The forward end of the swinging arm is normally returned to and held in raised position by a tension spring 22. The spring pressed plunger 23 limits, without shock, the extent of movement of the swinging arm, and the latter may be counterbalanced by an adjustable weight 24.

The indicator slide screw $r$ is journalled in a bracket 25 carried by the right hand end of the head $i$. Also journalled in this bracket for longitudinal sliding movement is a shaft 26 to which is secured, or on which is milled, the small pinion $t$ and the operating knob or handle $s$. It is to be noted that to adjust the indicating device in accordance with the length or character of the piece to be tested, the fulcrum member $f$, together with the parts carried thereby, will be moved to, and then clamped in, proper position. During the testing operation, when it is desired to quickly move the indicating device, the screw $r$ will be turned directly by the knob $q$ thereon, and when it is desired to slowly and very accurately move the indicating device, the knob $s$ will be turned so as to rotate the screw through the pinion $t$ and gear $u$, the latter being fixed to the screw. Mounted on the screw $r$ is a dial or scale 27 which cooperates with an indicating mark 28 so that the position, or the extent of movement, of the indicating device may be quickly determined with approximate accuracy. When the knob $q$ is turned, the pinion is out of mesh with the gear $u$, the pinion having been moved to the position shown in Fig. 1. When the knob $s$ is to be turned, it is drawn out so as to bring the pinion and gear into mesh.

The indicator will now be described in detail. Pivoted to the front face and adjacent the lower end of the bracket $m$, is a point lever 31 having, at its lower end, a socket 32 adapted to receive the point $n$, the operative end of which is in the form of a small sphere, as shown. The point lever 31 is pivoted, as stated, by means of a knife edge 33, engaging in the V of the block or rest 34 secured to the bracket $m$. Adjacent the upper end of the point lever 31 is a depending knife edge 35 which engages in a V 36 carried by a link lever 37 supported by a spring 38. Adjacent the opposite end of the link lever 37 is a V 40 in which engages a depending knife edge 41 carried by, what may be termed for convenience, a magnifying lever 42 to the lower end of which is secured the weight 43. The purpose of the weight is to counterbalance the lever so as to normally urge the same into vertical position. To the forward face of this weight is attached by welding or otherwise, the relatively light-weight finger $o$. The magnifying lever 42 is in the form of an inverted U straddling the right hand end of the lever 37. This magnifying lever is provided at the end of each leg with alined knife edges 44 engaging in the inverted V's 45 located in the lower end of a block 46 secured to the bracket $m$ by screws 47. It will be seen that the vertical distance between the knife edge 41 on the one hand, and the knife edges 44 on the other is relatively short. The spring 38 is connected at its upper end to a pin 48 projecting from the block 46, and at its lower end to the intermediate portion of the link lever 37.

It will be seen that the spring 38 supports and maintains in position the point lever, the link lever 37 and the magnifying lever 42, together with the parts carried thereby. In other words, the several cooperating knife edges and V seats of the indicating device are maintained in cooperative relation by the spring 38. The indicator device may be housed, or not, as desired within a suitable casing such as that indicated by the numeral 50. At the upper end of this casing is a scale 51 with which the free end of the finger $o$ cooperates. When the point is brought into engagement with the piece to be tested and thereby moved, say for instance, to the right, referring to Figs. 1–2, the upper end of the point lever moves substantially three times this distance toward the left drawing the link lever 37 with it, and thereby causing the finger $o$ to swing about its fulcrum constituted by the knife edges 45.

It will be understood that a very slight, in fact extremely minute, movement of the point $n$ will, through the system of links and levers described, be so transmitted to the finger $o$ that the free end of the latter will have a relatively large movement, swinging through an arc over the scale 51 many times greater than the extent of movement of the pointer. In the embodiment disclosed, this movement is substantially in the ratio of one hundred and fifty to one. The feature of pivotally supporting and connecting the movable parts of the indicator by means of knife edges is of the utmost advantage, for with this arrangement the parts may be positioned with the greatest accuracy, friction is substantially eliminated, and there is practically no wear; all of which means that the indicator will have a long life during which the parts remain constant in their relation to one another, thus maintaining the maximum efficiency and practically eliminating the introduction of all errors on account of wear or the like.

Secured to the side of the casing 50 is a plate or anvil 53 which is placed opposite an operating stud or plunger 54 of the drop pin arrangement $p$. This plunger 54 is mounted for sliding movement in a bracket 55 secured to the left hand end of the head or slide bracket $i$. Fixed to the plunger is a collar 56 between which and a bushing 57 fixed to the bracket is interposed a spring 58 which urges the plunger towards the right, referring to Figs. 1 and 5. The collar and plunger are maintained against rotation by a key 59 secured to the collar and having sliding movement in a key-way 60 provided in the bracket 55. This key may be extended through the collar so as to form a projection 61 for limiting the dropping movement of the drop pin. Secured to the collar is a stud 62, and carried by the bracket is an alined stud 63 and between these studs the drop 64 is adapted to be positioned. This drop pin has a head with its side faces in parallelism with each other, and a stem as is most clearly shown in Fig. 5.

For the purpose of successively positioning the indicator at spaced distances as, for example, in accordance with the desired lead of the screw thread tested, a plurality of gauge blocks are provided. One of said blocks is shown in Fig. 5 and is designated by the numeral 66. These blocks are adapted to be selectively positioned on the surface or seat 67 between the anvil 53 and the cooperating plunger 54.

The operation of the apparatus illustrated in Figs. 1 to 6, briefly, is as follows: If necessary, the fulcrum member or rest $f$, together with the support $h$ and the parts carried thereby, is adjusted so that the point $n$ of the indicator may be brought into engagement with the piece to be tested. The drop pin 64 is positioned between the studs 62 and 63, the pin being frictionally held by these studs in such position that its stem is suspended in a horizontal plane.

The indicator is now moved with a relatively quick motion by turning the knob $q$ so as to bring the anvil 53 into approximate engagement with the plunger 54 of the drop pin arrangement. Owing to the scale 27, the indicating device may be brought very accurately into such position that the anvil is almost in engagement with the plunger 54, and thus a saving of time will be effected in adjusting the device, since, thereafter, the knob $s$ need be turned but a slight extent. The knob $s$ is then pulled out to engage the pinion $t$ with the gear $u$, and this knob is then slowly turned until the anvil is just brought into engagement with the end of the plunger, this engagement being indicated by the free end of the pin starting to fall.

During these adjustments, it is, of course, understood that the forward end of the swinging support $h$ is held in raised position by the tension of the spring 22. Upon completion of these adjustments, the piece to be tested is positioned upon the work support. Where the piece is a screw, it is placed between the centers 10 and 11 and the point $n$ is gently brought into engagement with one of the grooves of the piece to be tested (see Fig. 1) by rocking the arm $h$ by means of the operating handle 68. The center 10 is then adjusted by means of the hand wheel 12 so that the free end of the finger $o$ will stand at the zero mark on the scale 51. This adjustment of the piece is possible owing to the fact that the center 11 is spring pressed. This spring pressed plunger is also of advantage in that it will hold the piece securely and steady between the centers. The indicator is now raised and moved slightly to the right; a gauge block corresponding to the lead of the thread to be tested is positioned against the end of the plunger 54; and the indicator is then moved by the knob $q$ until the scale 27 indicates that the anvil is approximately in engagement with the gauge block. Then the indicator is slowly moved by turning the knob $s$ until the anvil is in engagement with the gauge block. This engagement is indicated by the falling movement of the drop pin 64, it being obvious that when the anvil is brought into engagement with the gauge block, the plunger 54 will be moved very slightly to the left, referring to Figs. 1 and 5, carrying with it the collar 56 and the stud 62 fixed to the collar. When the stud 62 is thus moved, the distance between the stud and the fixed stud 63 is increased, which means that the friction on the pin 64 becomes less so that the outer end of the pin may swing downwardly. The point $n$ is then engaged in one of the successive convolutions of the screw thread, and, if the lead of this thread is not absolutely correct, the free end of the pointer finger $o$ will stand to one or the other side of the zero mark of the scale 51. Owing to the fact that a slight movement of the pin is magnified many times in the finger $o$, the extent of inaccuracies in the lead may be determined with the utmost precision. The successive convolutions of the thread may be tested by successively interposing the proper size gauge blocks between the anvil and the drop pin arrangement.

It is to be noted that the swinging arm which carries the indicator is pivoted by means of knife edges, this being of advantage in that wear between the parts is practically eliminated, and lost motion between the parts is substantially obviated, thus assuring that no inaccuracies occur during the testing operation.

Figure 8:
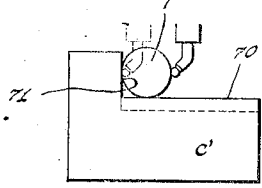
Figs. 8 and 9 are detail views illustrating the manner in which the diameter and length of a cylinder may be determined.
Figure 9:
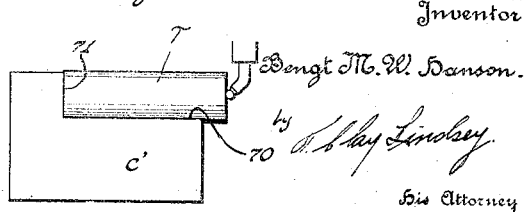

When the length, width or other dimension of a part or piece is to be measured, it may be placed on a suitable support (such as the support or block $c'$ shown in Figs. 8 and 9) positioned on the base $a$ in place of the stocks $c$ and $d$. In Figs. 8 and 9, the block $c'$ is illustrated as having a surface 70 supporting the work, and a vertical face or abutment 71. The surface 70 may be grooved as shown. To test the diameter of the cylinder T, the block $c'$ is so placed on the base that when the point $n$ engages the face 71, the anvil 53 is just in engagement with the drop pin plunger, and the finger $o$ stands at zero. The cylinder T is then placed on the surface 70; a gauge block corresponding to the desired diameter of the cylinder is placed between the anvil and the drop pin plunger, and the indicator is then lowered into engagement with the cylinder. If the diameter of the cylinder is incorrect, the finger $o$ will indicate the extent of incorrectness. The device may also be used to test the straightness or trueness of surfaces. For example, by moving the indicator while the point $o$ is in contact with the face 71 (or the end face of the cylinder T), the trueness of the faces may be determined by observing the extent, if any, of movement of the finger $o$ across the scale.

Figure 7:
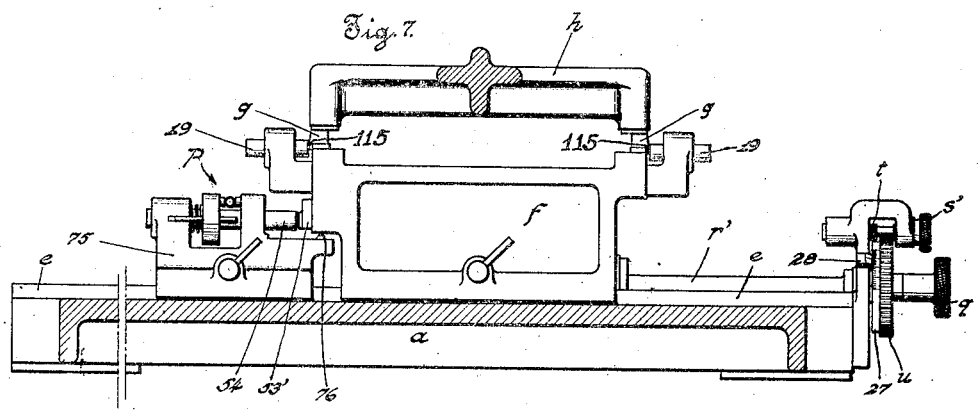
Fig. 7 is a vertical sectional view taken substantially on line 7—7 of Fig. 6.

The embodiment of my invention shown in Figs. 6 and 7 is very similar to that of the preceeding figures. In this embodiment, instead of mounting the drop pin arrangement $p$ on the swinging arm and adjustably mounting the indicating device $m$ on that arm, the drop pin arrangement $p$ is mounted (preferably for adjustment) on the base $a$, and the fulcrum rest $f$ is adjusted relatively to the drop pin arrangement. This latter construction is of advantage when it is desired to measure pieces of work of relatively greater length.

Referring to Figs. 6 and 7 more specifically, it will be seen that the drop pin arrangement $p$ is carried by a stock 75 which may be adjusted on the way $e$. The fulcrum member $f$ has an anvil 53' adapted to cooperate with the plunger 54. This fulcrum member is adjusted or moved in the same manner and for the same purpose as was the indicating device on the arm $h$ of the embodiment shown in Figs. 1 to 5. This is to say, the fulcrum member is moved by the screw $r'$ which is rotated by the knobs $s'$ and $q'$. The stock 75 has a surface 76 for supporting gauge blocks positioned between the plunger 54 and the anvil 53'.

I claim as my invention:

1. In an apparatus of the character described, an indicator including a point and an indicating finger associated therewith; a drop pin arrangement having a definite position relative to said apparatus for indicating the proper positioning of said indicator and means for adjusting said indicator relative to said drop pin arrangement.

2. In an apparatus of the character described, an indicator having a point and an indicating finger associated therewith, means for supporting a piece to be tested, a drop pin arrangement having a predetermined position relative to said supporting means, said indicator being movable in one direction relative to said supporting means to bring the point into and out of engagement with the piece to be tested, and means for adjusting said indicator at right angles to said first direction and relative to said drop pin arrangement, said drop pin arrangement being adapted to indicate the proper positioning of said indicator.

3. In an apparatus of the character described, an indicator including a point adapted to engage the piece to be tested and an indicating finger associated therewith; a drop pin arrangement having a definite position relative to said apparatus for designating when said indicator has been brought to proper position, means for adjusting said indicator relative to said drop pin arrangement and a plurality of interchangeable means adapted to be interposed between said indicator and drop pin arrangement for determining the extent of adjustment of said indicator.

4. In an apparatus of the character described, an indicator having a mounting and including a point adapted to engage the piece to be tested, an indicating finger and a connection between said point and indicating finger whereby a relatively small movement of the former results in a relatively large movement of the latter; a drop pin arrangement having a definite position relative to said apparatus and having a spring pressed member, means for adjusting said indicator relative to said spring pressed member, and a plurality of gauge blocks adapted to be interchangeably positioned between said indicator and member.

5. In an apparatus of the character described, an indicator including a point adapted to engage the piece to be tested, an indicating finger and a connection between said point and indicating finger whereby a relatively small movement of the former results in a relatively large movement of the latter, an adjustable mounting carrying said indicator for movement towards and away from the work, a drop pin arrangement having a definite position relative to said apparatus, means for adjusting said indicator relative to said drop pin arrangement and a rest adapted to interchangeably support a plurality of gauge blocks between said mounting and said drop pin arrangement for determining the extent of adjustment of said indicator.

6. In an apparatus of the character described, a support adapted to be moved into and out of operative relation with respect to the piece to be tested; an indicator adjustably mounted on said support and including a point and an indicating finger associated therewith; a drop pin arrangement having a definite position relative to said apparatus, said arrangement being carried by said support and including a member relative to which said indicator is adapted to be moved; means for adjusting said indicator relative to said drop pin arrangement and a rest on said support on which are adapted to be interchangeably positioned a plurality of gauge blocks between said member and said indicator.

7. In an apparatus of the character described, a support adapted to be moved towards and away from the piece to be tested, a slide mounted on said support for adjustment in parallelism with the axis of the piece to be tested; an indicator carried by said slide and including a pivoted point and an indicating finger associated therewith; a drop pin arrangement fixed to said support and including a spring pressed plunger, an anvil on said indicator; a surface on said support adapted to receive interchangeable gauge blocks interposed between said plunger and anvil, and means for adjusting said slide relative to said drop pin arrangement.

8. In an apparatus of the character described, an adjustable mounting, an indicator carried by said mounting and including a point and an indicating finger associated therewith, a screw associated with said mounting for adjusting the same, means for rotating said screw at a relatively fast rate of speed to roughly adjust said indicator, and means associated with said screw for slowly rotating the same to effect a fine adjustment of said indicator.

9. In an apparatus of the character described, an adjustable mounting, an indicator carried by said mounting and including a point and an indicating finger associated therewith, a screw associated with said mounting for adjusting the same, means for rotating said screw at a relatively fast rate of speed to roughly adjust said indicator, means associated with said screw for slowly rotating the same to effect a fine adjustment of said indicator, and a scale associated with said screw for indicating the extent of adjustment of said indicator.

10. In an apparatus of the character described, a support, a slide thereon, an indicator carried by said slide and including a point and an indicating finger associated therewith; a drop pin arrangement carried by said support for indicating the proper positioning of said indicator; a screw associated with said slide for moving the same, means for rotating said screw at a relatively fast speed to roughly adjust said indicator, and means associated with said screw for slowly rotating the same to effect a fine adjustment of said indicator relative to said drop pin arrangement.

11. In an apparatus of the character described, a fulcrum member, a swinging support fulcrumed thereon against other than swinging movement, an indicator including a member on said support, a point and a finger associated therewith, and means for adjusting one of said members in parallelism with the axis on which said support is fulcrumed.

12. In an apparatus of the character described, a fulcrum member, a swinging support fulcrumed thereon against other than swinging movement, an indicator including a member carried by said support, a point adapted to engage the piece to be tested, and indicating finger and a connection between said point and indicating finger whereby a relatively small movement of the point is indicated by a relatively large movement of the finger, means for adjusting one of said members in parallelism with the axis about which said support swings, and means for indicating the extent of such adjustment.

13. In an apparatus of the character described, a fulcrum rest, a swinging support fulcrumed thereon against other than swinging movement, a slide mounted on said support for movement in parallelism with the axis on which said support is fulcrumed; an indicator carried by said slide and including a point adapted to engage the piece to be tested, an indicating finger, and a connection between said point and finger whereby a relatively small movement of the point is indicated by a relatively large movement of the finger; and means carried by said swinging support for designating when said indicator has been brought into predetermined position.

14. In an apparatus of the character described, a base, means thereon for holding a piece to be tested, a fulcrum member adjustably mounted on said base, a swinging support, knife edges for fulcruming said support on said member, an indicator including a member on said support, a point, and an indicating finger associated therewith, means for adjusting one of said members, and means for determining the extent of such adjustment.

15. In an apparatus of the character described, a base, means thereon for holding a piece to be tested, a fulcrum rest mounted for adjustment on said base, a swinging support, knife edges for fulcruming said support on said rest, an indicator adjustably mounted on the forward end of said support and including a point and an indicating finger associated therewith; and means for normally holding the said swinging member with said indicator in raised position.

16. In an apparatus of the character described, a pair of stocks each having a center between which the piece to be tested is adapted to be supported, one of said centers being normally urged longitudinally towards the other, and the other being longitudinally adjustable; an indicator including a point and an indicating finger associated therewith; and a support for said indicator so arranged that said indicator may be moved towards and from the piece, and adjusted longitudinally of said piece.

17. In an apparatus of the character described, a base; a pair of stocks thereon, each having a center between which the piece to be tested is adapted to be held, one of said centers being spring pressed towards the other one, and the other one being longitudinally adjustable; a swinging support fulcrumed on an axis parallel to said centers; an indicator slidably mounted on said support in parallelism of the axis about which said support is fulcrumed, and including a point and an indicating finger associated therewith; and means for adjusting said indicator on said support.

18. An indicator of the character described, including a pivoted point lever, a magnifying lever disposed in a vertical plane, a finger secured to said magnifying lever, a link lever supporting on one of its ends said point lever and supporting on the other of its ends said magnifying lever, and a spring for holding said levers in operative position.

19. An indicator of the character described, including a pivoted point lever, a magnifying lever, a finger secured to said magnifying lever, a link lever supporting on one of its ends said point lever, and supporting on the other of its ends said magnifying lever, and a spring for holding said levers in operative position.

20. An indicator of the character described, including a point lever, a magnifying lever, knife edge fulcrums on which said levers are fulcrumed, a link lever, knife edge fulcrums between said link lever and said point lever and magnifying lever, and resilient means for supporting all said levers.

21. An indicator of the character described, including a point lever, a point carried thereby, a fixed fulcrum rest, a knife edge on said lever engaging the underside of said rest, a magnifying lever, a second fixed rest, a knife edge on said magnifying lever engaging the underside of said second rest, a link lever having a rest at each end, an inverted knife edge adjacent the upper end of said point lever engaging one of said rests of said link lever, an inverted knife edge on said magnifying lever immediately adjacent and spaced above said second rest and resting on the rest on the other end of said link lever, and a spring for holding the parts together.

22. In an apparatus of the character described, a fulcrum rest, a swinging support fulcrumed thereon, an indicating mechanism on said support, and anti-friction means for supporting said support on said rest against other than swinging movement.

23. In an apparatus of the character described, a fulcrum rest, a support, knife edges for fulcruming said support on said rest, thrust members having a point engagement with said knife edges in alinement with the edges to hold said support against other than swinging movement, and an indicator on said swinging support.

BENGT M. W. HANSON.